United States Patent
Fang et al.

(10) Patent No.: US 12,438,219 B2
(45) Date of Patent: Oct. 7, 2025

(54) BATTERY CELL INCLUDING END CAP WITH PROTRUDING STRUCTURE CONNECTING TO TAB, METHOD AND SYSTEM FOR MANUFACTURING SAME, BATTERY, AND ELECTRICAL DEVICE

(71) Applicant: CONTEMPORARY AMPEREX TECHNOLOGY (HONG KONG) LIMITED, Hong Kong (CN)

(72) Inventors: Kun Fang, Fujian (CN); Zhijun Guo, Fujian (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 2 days.

(21) Appl. No.: 18/201,785

(22) Filed: May 25, 2023

(65) Prior Publication Data

US 2023/0299395 A1 Sep. 21, 2023

Related U.S. Application Data

(63) Continuation of application No. PCT/CN2021/122105, filed on Sep. 30, 2021.

(51) Int. Cl.
*H01M 50/169* (2021.01)
*H01M 10/0525* (2010.01)
(Continued)

(52) U.S. Cl.
CPC ..... *H01M 50/169* (2021.01); *H01M 10/0525* (2013.01); *H01M 50/107* (2021.01); *H01M 50/152* (2021.01); *H01M 50/538* (2021.01)

(58) Field of Classification Search
CPC ............. H01M 50/169; H01M 50/107; H01M 50/538; H01M 50/152; H01M 50/0525
(Continued)

(56) References Cited

U.S. PATENT DOCUMENTS 6,001,504 A 12/1999 Batson et al.
2005/0118501 A1* 6/2005 Hashimoto ......... H01M 50/171
429/176
(Continued)

FOREIGN PATENT DOCUMENTS

| CN | 204946950 U | 1/2016 |
|---|---|---|
| CN | 106537651 A | 3/2017 |

(Continued)

OTHER PUBLICATIONS

Office Action issued Feb. 13, 2024 in Japanese Patent Application No. 2023-503991 with English translation thereof.

(Continued)

*Primary Examiner* — Sean P Cullen
(74) *Attorney, Agent, or Firm* — XSENSUS LLP

(57) ABSTRACT

A battery cell may include: a housing, on which an opening is made; an electrode assembly, accommodated in the housing; and an end cap, configured to fit and cover the opening. The end cap may include a cap body and a protruding structure around the cap body, the protruding structure may protrude from an inner surface of the cap body toward the electrode assembly, and at least a part of the protruding portion may be located in the housing and configured to fit with the housing. A recess may be formed on the end cap at a position corresponding to the protruding structure, and the recess may be recessed from an outer surface of the cap body toward the electrode assembly and configured to release a stress while the protruding portion extends into the housing.

14 Claims, 6 Drawing Sheets

(51) Int. Cl.
*H01M 50/107* (2021.01)
*H01M 50/152* (2021.01)
*H01M 50/538* (2021.01)

(58) Field of Classification Search
USPC .................................. 429/163, 164, 167, 170
See application file for complete search history.

(56) References Cited

U.S. PATENT DOCUMENTS

| | | | | |
|---|---|---|---|---|
| 2010/0028759 A1* | 2/2010 | Ebine | ................... | H01M 50/188 |
| | | | | 429/163 |
| 2010/0040945 A1* | 2/2010 | Wang | ................... | H01M 50/143 |
| | | | | 429/164 |
| 2011/0274967 A1* | 11/2011 | Suzuki | ................ | H01M 50/167 |
| | | | | 429/185 |
| 2014/0255758 A1 | 9/2014 | Tsutsumi et al. | | |
| 2014/0370370 A1* | 12/2014 | Kawase | ................ | H01M 50/15 |
| | | | | 219/121.64 |
| 2017/0149046 A1 | 5/2017 | Urano et al. | | |

FOREIGN PATENT DOCUMENTS

| | | |
|---|---|---|
| CN | 207504025 U | 6/2018 |
| CN | 112310561 A | 2/2021 |
| CN | 113258179 A | 8/2021 |
| CN | 113300033 A | 8/2021 |
| CN | 113346201 A * | 9/2021 |
| CN | 214203812 U | 9/2021 |
| CN | 217182288 U | 8/2022 |
| GB | 1206627 A | 9/1970 |
| JP | S49-17338 B1 | 4/1974 |
| JP | S52-17701 Y | 4/1977 |
| JP | S60-33569 Y | 10/1985 |
| JP | 2000-331655 A | 11/2000 |
| JP | 2002329484 A * | 11/2002 |
| JP | 2011-159498 A | 8/2011 |
| JP | 2019-519078 A | 7/2019 |
| WO | 2013/024774 A1 | 2/2013 |
| WO | 2020/138492 A1 | 7/2020 |
| WO | 2022/190671 A1 | 9/2022 |

OTHER PUBLICATIONS

Extended European Search Report issued Jun. 13, 2024 in European Patent Application No. 21949524.9.
International Search Report and Written Opinion mailed on Jun. 24, 2022, received for PCT Application PCT/CN2021/122105, filed on Sep. 30, 2021, 8 pages including English Translation.
Office Action issued Feb. 4, 2025 in European Patent Application No. 21949524.9.
Request for the Submission of an Opinion issued May 13, 2025 in Korean Patent Application No. 10-2023-7003468 with English translation thereof.
Notice of Registration issued Jun. 25, 2025 in Chinese Patent Application No. 202180081112.2 with English translation thereof.

* cited by examiner

BATTERY CELL INCLUDING END CAP WITH PROTRUDING STRUCTURE CONNECTING TO TAB, METHOD AND SYSTEM FOR MANUFACTURING SAME, BATTERY, AND ELECTRICAL DEVICE

CROSS-REFERENCE TO RELATED APPLICATION

The present application is a continuation of International Application No. PCT/CN 2021/122105, filed Sep. 30, 2021, which is incorporated herein by reference in its entirety.

TECHNICAL FIELD

This application relates to the technical field of batteries, and more specifically, to a battery cell, a method and system for manufacturing same, a battery, and an electrical device.

BACKGROUND

Battery cells are widely used in electronic devices such as a mobile phone, a notebook computer, an electric power cart, an electric vehicle, an electric airplane, an electric ship, an electric toy car, an electric toy ship, an electric toy airplane, and a power tool. The battery cells may include a nickel-cadmium battery cell, a nickel-hydrogen battery cell, a lithium-ion battery cell, a secondary alkaline zinc-manganese battery cell, and the like.

In the development of battery technology, how to enhance efficiency of assembling battery cells is a research topic in the battery technology.

SUMMARY

This application provides a battery cell, a method and system for manufacturing same, a battery, and an electrical device to improve the assembling efficiency of the battery cell and enhance safety of the battery cell.

According to a first aspect, an embodiment of this application provides a battery cell, including:
  a housing, on which an opening is made;
  an electrode assembly, accommodated in the housing; and
  an end cap, configured to fit and cover the opening, where
    the end cap includes a cap body and a protruding portion or structure around the cap body, the protruding portion protrudes from an inner surface of the cap body toward the electrode assembly, and at least a part of the protruding portion is located in the housing and configured to fit with the housing, where
  a recessed portion or recess is formed on the end cap at a position corresponding to the protruding portion, and the recessed portion is recessed from an outer surface of the cap body toward the electrode assembly and configured to release a stress while the protruding portion extends into the housing.

In the foregoing solution, in a process of fitting the end cap onto the housing, the protruding portion is able to extend into the housing and fit with the housing to limit the position of the end cap, thereby reducing the difficulty of positioning the housing and the end cap and improving the assembling efficiency of the battery cell. The housing is able to limit the position of the end cap by using the protruding portion. In this way, offset and misalignment between the end cap and the housing are reduced in a process of connecting the end cap and the housing, and the sealing performance is improved. The recessed portion reduces strength of the protruding portion. In this way, when the protruding portion and the housing squeeze each other, the protruding portion is able to release the stress by deforming, reduce an extrusion force and friction between the protruding portion and the housing, reduce resulting particles, reduce the risk of deformation of the housing, and improve the safety performance of the battery cell.

In some embodiments, in a thickness direction of the end cap, a bottom face of the recessed portion is closer to the electrode assembly than the entire inner surface of the cap body.

The foregoing technical solution ensures a sufficient depth of the first recessed portion to increase the amount by which the protruding portion protrudes beyond the inner surface of the cap body. This improves the effect of the fit between the protruding portion and the housing, and increases elasticity of the protruding portion, thereby reducing the extrusion force and friction between the protruding portion and the housing, reducing the resulting particles, reducing the risk of deformation of the housing, and improving the safety performance of the battery cell.

In some embodiments, a sidewall of the housing extends along a thickness direction of the end cap and is disposed around the electrode assembly, and an inner wall face of the sidewall and an outer peripheral face of the protruding portion are both parallel to the thickness direction, and are disposed opposite to each other.

In the foregoing technical solution, the inner wall face of the sidewall is parallel to the outer peripheral face of the protruding portion. In this way, when the inner wall face of the sidewall and the outer peripheral face of the protruding portion contact and squeeze each other, the force exerted between the inner wall face of the sidewall and the outer peripheral face of the protruding portion is relatively uniform, thereby reducing stress concentration, and reducing deformation of the housing and the protruding portion.

In some embodiments, the sidewall of the housing is in interference fit with the protruding portion so that the inner wall face of the sidewall abuts against the outer peripheral face of the protruding portion.

In the foregoing solution, the interference fit increases connection strength between the housing and the end cap, and improves the sealing performance. In this technical solution, the strength of the protruding portion is reduced by the recessed portion, so that the force exerted between the protruding portion and the housing is reduced while the protruding portion extends into the housing. In this way, even if the housing is in interference fit with the protruding portion, the resulting particles can be reduced, the risk of deformation of the housing can be reduced, and the safety performance of the battery cell can be improved.

In some embodiments, the inner wall face of the sidewall is welded to the outer peripheral face of the protruding portion to form a first weld portion or structure. In the thickness direction that extends away from the electrode assembly, the first weld portion does not extend beyond the outer surface of the cap body.

In the foregoing solution, the cap body may serve as a load-bearing structure of the battery cell. After the battery cell is mounted into an electrical device, an external support structure is able to support the battery cell through the cap body. In this technical solution, the first weld portion does not extend beyond the outer surface of the cap body in the direction oriented away from the electrode assembly, thereby reducing the force between the external support structure and the first weld portion, reducing the risk of rupturing the first weld portion, and ensuring high connection strength and sealing performance between the housing and the end cap.

In some embodiments, the sidewall includes a first outer end face around the opening, and the first outer end face is connected to the inner wall face of the sidewall. In the thickness direction, the protruding portion includes a second outer end face at an end oriented away from the electrode assembly. The second outer end face is connected to the outer peripheral face of the protruding portion. The first outer end face is flush with the second outer end face. The first outer end face and the second outer end face are closer to the electrode assembly than the outer surface of the cap body.

The foregoing technical solution makes the first outer end face and the second outer end face closer to the electrode assembly than the outer surface of the cap body. In this way, even if the first weld portion protrudes beyond the first outer end face and the second outer end face, the first weld portion is still prevented from extending beyond the outer surface of the cap body in the direction oriented away from the electrode assembly, thereby reducing the force exerted on the first weld portion, reducing the risk of rupturing the first weld portion, and ensuring high connection strength and sealing performance between the housing and the end cap.

In some embodiments, the housing further includes a flanged portion or structure. The flanged portion is connected to the sidewall and bent toward the cap body against the sidewall to cover the first weld portion.

In the foregoing technical solution, the flanged portion is able to protect the first weld portion, reduce the risk of corroding and damaging the first weld portion, and ensure high connection strength and sealing performance between the housing and the end cap.

In some embodiments, the end cap further includes an extension portion or structure protruding beyond the outer peripheral face of the protruding portion and surrounding the protruding portion. An inner surface of the extension portion is welded to a first outer end face of the sidewall around the opening, so that the housing and the end cap are connected into one piece.

In the foregoing technical solution, in a process of fitting the end cap onto the housing, the first outer end face serves a function of limiting the position in the thickness direction of the end cap, thereby reducing the risk of excessive insertion of the end cap into the housing, and improving the efficiency of assembling.

In some embodiments, the protruding portion is in clearance fit with the housing to form a clearance between the outer peripheral face of the protruding portion and the inner wall face of the sidewall.

In the forgoing technical solution, the clearance fit not only ensures proper limitation of the position of the protruding portion by the housing, but also reduces the force exerted between the protruding portion and the housing while the protruding portion extends into the housing, thereby reducing the risk of friction between the protruding portion and the housing, reducing the resulting particles, reducing the deformation of the housing, and improving the safety performance of the battery cell.

In some embodiments, in a direction pointing to the sidewall from the electrode assembly, the clearance between the outer peripheral face of the protruding portion and the inner wall face of the sidewall is 0.02 mm to 0.5 mm in size.

In the foregoing technical solution, the smaller the clearance in size, the higher the risk of friction between the outer peripheral face of the protruding portion and the inner wall face of the sidewall, and the higher the risk of generating particles. The larger the clearance in size, the wider the range in which the protruding portion is movable after the protruding portion extends into the housing, and the higher the risk of poor welding between the extension portion and the housing. The inventor hereof sets the size of the clearance to 0.02 mm to 0.5 mm to counterbalance the risk and improve the safety performance.

In some embodiments, an avoidance slot is disposed on the inner surface of the extension portion. The avoidance slot is disposed around the protruding portion, and a slot wall face of the avoidance slot is configured to connect the inner surface of the extension portion and the outer peripheral face of the protruding portion.

In the foregoing technical solution, during formation of the protruding portion, a rounded corner is disposed at a junction between the protruding portion and the extension portion to reduce stress concentration. In this technical solution, an avoidance slot is disposed on the extension portion. A part that is of the extension portion and that is opposite to the avoidance slot is connected to the protruding portion. The avoidance slot is recessed, so as to provide a flow space for a material of the protruding portion during formation of the protruding portion. In this way, the rounded corner is formed on the part that is of the extension portion and that is opposite to the avoidance slot. The rounded surface is a part of the slot wall face of the avoidance slot. The slot wall face is recessed against the inner surface of the extension portion. Therefore, this embodiment ensures the first outer end face to smoothly abut on the inner surface of the extension portion to prevent the rounded corner from interfering with the first outer end face.

In some embodiments, an outer surface of the extension portion is flush with the outer surface of the cap body.

In the foregoing technical solution, the external support structure is able to support the battery cell through the extension portion and the cap body, thereby increasing the area of the load-bearing part of the end cap and increasing stability of the battery cell.

In some embodiments, in a direction pointing to the sidewall from the electrode assembly, the extension portion does not extend beyond an outer wall face of the sidewall.

The foregoing technical solution prevents the extension portion from increasing a maximum size of the battery cell, and ensures a high energy density of the battery cell. In addition, the end cap is relatively thin. The extension portion may scratch other external components if extending beyond the outer wall face of the sidewall.

In some embodiments, in the direction pointing to the sidewall from the electrode assembly, the outer wall face of the sidewall extends beyond the extension portion by 0.02 mm to 0.5 mm.

In the foregoing technical solution, the smaller the amount by which the outer wall face of the sidewall extends beyond the extension portion, the higher the risk of protruding beyond the outer wall face of the sidewall by the second weld portion formed by the welding between the sidewall and the extension portion. The larger the amount by which the outer wall face of the sidewall extends beyond the extension portion, the smaller the connection area between the extension portion and the sidewall, and the lower the connection strength between the extension portion and the sidewall. The inventor hereof sets the amount by which the outer wall face of the sidewall extends beyond the extension portion to 0.02 mm to 0.5 mm, and therefore, on the premise of ensuring high connection strength, minimizes the risk that the second weld portion protrudes beyond the outer wall face of the sidewall.

In some embodiments, in the direction pointing to the sidewall from the electrode assembly, an amount by which the extension portion extends beyond the outer peripheral face of the protruding portion is less than a wall thickness of the sidewall.

In the foregoing solution, when the outer peripheral face of the protruding portion abuts on the inner wall face of the sidewall, because the wall thickness of the sidewall is greater than the amount by which the extension portion protrudes beyond the outer peripheral face of the protruding portion, the outer wall face of the sidewall extends beyond the extension portion in the direction pointing to the sidewall from the electrode assembly.

In some embodiments, the protruding portion further includes a guide face oriented toward the sidewall. The guide face is connected to an end that is the outer peripheral face of the protruding portion and that is close to the electrode assembly. The guide face tilts away from the inner wall face of the sidewall against the outer peripheral face of the protruding portion to guide the protruding portion to extend into the housing.

In the foregoing technical solution, by disposing a tilting guide face on the protruding portion, the protruding portion can be guided into the housing in a process of fitting the end cap onto the housing, thereby simplifying the assembling process and improving the assembling efficiency.

In some embodiments, the protruding portion abuts on a first tab of the electrode assembly to support the first tab.

In the foregoing solution, the protruding portion is able to support the first tab, thereby reducing the shaking amplitude of the electrode assembly during vibration of the battery cell, and improving stability of the electrode assembly.

In some embodiments, the protruding portion is welded to the first tab to electrically connect the first tab and the end cap.

In the foregoing technical solution, the protruding portion is directly welded to the first tab without requiring other adapters, thereby simplifying the structure of the battery cell. In this technical solution, the thickness of the protruding portion is reduced by the recessed portion, thereby reducing the welding power required for welding the protruding portion to the first tab, reducing heat emission, and reducing the risk of burning other components.

In some embodiments, the first tab of the electrode assembly is electrically connected to the housing by the end cap.

In the foregoing technical solution, the housing is connected to the first tab of the electrode assembly by the end cap, so that the potential of the housing is basically the same as the potential of the first tab. In this way, the housing itself may serve as an output electrode of the battery cell, thereby saving a conventional electrode terminal and simplifying the structure of the battery cell. When a plurality of battery cells are assembled into a group, the housing may be electrically connected to a busbar component, thereby not only increasing the passage area, but also making the structural design of the busbar component more flexible.

In some embodiments, the housing includes a sidewall and a bottom wall. The sidewall extends along a thickness direction of the end cap and is disposed around the electrode assembly. The bottom wall is connected to one end of the sidewall and located on a side that is of the electrode assembly that is oriented away from the end cap. An electrode lead-out hole is disposed on the bottom wall. A second tab is disposed on the electrode assembly at an end oriented toward the bottom wall, and the first tab and the second tab are of opposite polarities. The battery cell further includes an electrode terminal mounted in the electrode lead-out hole, and the electrode terminal is electrically connected to the second tab.

In the foregoing solution, the bottom wall and the electrode terminal may serve as two output electrodes of the battery cell, thereby simplifying the structure of the battery cell and ensuring a high flow capacity of the battery cell. The bottom wall and the electrode terminal are located at the same end of the battery cell. In this way, the busbar component can be assembled onto the same side of the battery cell, thereby simplifying the assembling process and improving the efficiency of assembling a plurality of battery cells into groups.

In some embodiments, the bottom wall and the sidewall are a one-piece structure.

The foregoing technical solution avoids the step of connecting the bottom wall and the sidewall, and reduces a resistance between the bottom wall and the sidewall.

In some embodiments, the first tab is a negative tab, and a substrate material of the housing is steel.

In the foregoing technical solution, the housing is electrically connected to the negative tab. That is, the housing is in a low-potential state. The steel housing in the low-potential state is not prone to corrosion by an electrolytic solution, thereby reducing safety hazards.

In some embodiments, the battery cell is a cylindrical cell.

According to a second aspect, an embodiment of this application provides a battery, including a plurality of battery cells according to any embodiment in the first aspect.

According to a third aspect, an embodiment of this application provides an electrical device, including the battery according to the second aspect. The battery is configured to provide electrical energy.

According to a fourth aspect, an embodiment of this application provides a method for manufacturing a battery cell, including:
  providing a housing, where an opening is made on the housing;
  providing an electrode assembly, and mounting the electrode assembly into the housing;
  providing an end cap, where the end cap includes a cap body and a protruding portion around the cap body, the protruding portion protrudes from an inner surface of the cap body, a recessed portion is formed on the end cap at a position corresponding to the protruding portion, and the recessed portion is recessed from an outer surface of the cap body;
  extending at least a part of the protruding portion into the housing to fit with the housing; and
  connecting the end cap and the housing so that the end cap fits and covers the opening, where
  the protruding portion protrudes from an inner surface of the cap body toward the electrode assembly, the recessed portion is recessed from an outer surface of the cap body toward the electrode assembly, and the recessed portion is configured to release a stress while the protruding portion extends into the housing.

According to a fifth aspect, an embodiment of this application provides a system for manufacturing a battery cell, including:
  a first providing apparatus, configured to provide a housing, where an opening is made on the housing;

a second providing apparatus, configured to provide an electrode assembly, and mount the electrode assembly into the housing;

a third providing apparatus, configured to provide an end cap, where the end cap includes a cap body and a protruding portion around the cap body, the protruding portion protrudes from an inner surface of the cap body, a recessed portion is formed on the end cap at a position corresponding to the protruding portion, and the recessed portion is recessed from an outer surface of the cap body;

a first assembling apparatus, configured to extend at least a part of the protruding portion into the housing to fit with the housing; and a second assembling apparatus, configured to connect the end cap and the housing so that the end cap fits and covers the opening, where the protruding portion protrudes from an inner surface of the cap body toward the electrode assembly, the recessed portion is recessed from an outer surface of the cap body toward the electrode assembly, and the recessed portion is configured to release a stress while the protruding portion extends into the housing.

BRIEF DESCRIPTION OF DRAWINGS

To describe the technical solutions in the embodiments of this application more clearly, the following outlines the drawings used in the embodiments of this application. Evidently, the drawings outlined below are merely a part of embodiments of this application. A person of ordinary skill in the art may derive other drawings from the outlined drawings without making any creative efforts.

Figure 1:
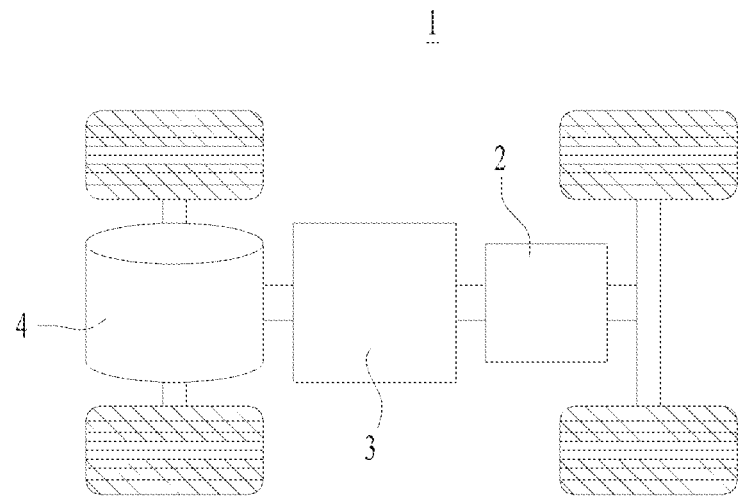
FIG. 1 is a schematic structural diagram of a vehicle according to some embodiments of this application.

The drawings are not drawn to scale.

DETAILED DESCRIPTION OF EMBODIMENTS

To make the objectives, technical solutions, and advantages of the embodiments of this application clearer, the following gives a clear description of the technical solutions in the embodiments of this application with reference to the drawings in the embodiments of this application. Evidently, the described embodiments are merely a part of but not all of the embodiments of this application. All other embodiments derived by a person of ordinary skill in the art based on the embodiments of this application without making any creative efforts fall within the protection scope of this application.

Unless otherwise defined, all technical and scientific terms used herein have the same meanings as commonly understood by a person skilled in the technical field of this application. The terms used in the specification of this application are merely intended to describe specific embodiments but not intended to limit this application. The terms "include" and "contain" and any variations thereof used in the specification, claims, and brief description of drawings of this application are intended as non-exclusive inclusion. The terms such as "first" and "second" used in the specification, claims, and brief description of drawings herein are intended to distinguish between different items, but are not intended to describe a specific sequence or order of precedence.

Reference to "embodiment" in this application means that a specific feature, structure or characteristic described with reference to the embodiment may be included in at least one embodiment of this application. Reference to this term in different places in the specification does not necessarily represent the same embodiment, nor does it represent an independent or alternative embodiment in a mutually exclusive relationship with other embodiments.

In the description of this application, unless otherwise expressly specified and defined, the terms "mount", "concatenate", "connect", and "attach" are understood in a broad sense. For example, a "connection" may be a fixed connection, a detachable connection, or an integrated connection; or may be a direct connection or an indirect connection implemented through an intermediary; or may be internal communication between two components. A person of ordinary skill in the art understands the specific meanings of the terms in this application according to the context.

The term "and/or" in this application indicates merely a relation for describing the related items, and represents three possible relationships. For example, "A and/or B" may represent the following three circumstances: A alone, both A and B, and B alone. In addition, the character "I" herein generally indicates an "or" relationship between the item preceding the character and the item following the character.

In embodiments of this application, the same reference numeral denotes the same component. For brevity, detailed descriptions of the same component are omitted in a different embodiment. Understandably, dimensions such as thickness, length, and width of various components in the embodiments of this application shown in the drawings, and dimensions such as overall thickness, length, and width of an integrated device are merely illustrative descriptions, but do not constitute any limitation on this application.

"A plurality of" referred to in this application means two or more (including two).

In this application, a battery cell may include a lithium-ion secondary battery cell, a lithium-ion primary battery cell, a lithium-sulfur battery cell, a sodium-lithium-ion battery cell, a sodium-ion battery cell, a magnesium-ion battery cell, or the like. The embodiments of this application do not limit the type of the battery cell. The battery cell may be in a cylindrical shape, a flat shape, a cuboidal shape, or other shapes, without being limited in embodiments of this application.

The battery mentioned in embodiments of this application means a stand-alone physical module that includes one or more battery cells to provide a higher voltage and a higher capacity. For example, the battery mentioned in this application may include a battery module, a battery pack, or the like. A battery typically includes a box configured to package one or more battery cells. The box prevents liquid or other foreign matters from affecting the charging or discharging of the battery cells.

A battery cell includes an electrode assembly and an electrolytic solution. The electrode assembly includes a positive electrode plate, a negative electrode plate, and a separator. The battery cell works primarily by shuttling metal ions between the positive electrode plate and the negative electrode plate. The positive electrode plate includes a positive current collector and a positive active material layer. The positive active material layer is coated on a surface of the positive current collector. The positive current collector includes a positive current collecting portion and a positive tab connected to the positive current collecting portion. The positive current collecting portion is coated with a positive active material layer. The positive tab is not coated with the positive active material layer. Using a lithium-ion battery as an example, the positive current collector may be made of aluminum. The positive active material layer includes a positive active material. The positive active material may be lithium cobalt oxide, lithium iron phosphate, ternary lithium, lithium manganese oxide, or the like. The negative electrode plate includes a negative current collector and a negative active material layer. The negative active material layer is coated on a surface of the negative current collector. The negative current collector includes a negative current collecting portion and a negative tab connected to the negative current collecting portion. The negative current collecting portion is coated with a negative active material layer. The negative tab is not coated with the negative active material layer. The negative current collector may be made of copper. The negative active material layer includes a negative active material. The negative active material may be carbon, silicon, or the like. The separator may be made of a material such as PP (polypropylene, polypropylene) or PE (polyethylene, polyethylene).

The battery cell further includes a housing and an end cap. An opening is made on the housing, and the housing is configured to accommodate the electrode assembly. The electrode assembly may be assembled into the housing through the opening of the housing. The end cap is configured to fit and cover the opening of the housing to implement sealing.

In the related art, in a process of fitting the end cap onto the housing, the end cap usually needs to be pressed against the opening end of the housing, and then the end cap is connected to the housing by welding or other means. However, the inventor hereof finds that in a process of pressing the end cap against the housing, the housing and the end cap are unable to limit the position of each other, thereby increasing the difficulty of positioning the housing and the end cap by a device and reducing the assembling efficiency of the battery cell. In addition, in a process of connecting the end cap and the housing, offset and misalignment are prone to occur between the end cap and the housing to affect the sealing performance.

As found by the inventor through research, a protruding portion may be disposed on the end cap. In a process of fitting the end cap onto the housing, the protruding portion is able to be inserted into the housing, and fit with the housing to limit the position of the end cap. The protruding portion reduces the difficulty of positioning the housing and the end cap, increases the assembling efficiency of the battery cell, reduces the offset and misalignment between the end cap and the housing in the process of connecting the end cap and the housing, and improves the sealing performance.

However, the inventor further finds that the protruding portion may squeeze the inner surface of the housing during insertion into the housing. The protruding portion and the housing rub against each other to form particles. The particles may drop into the electrode assembly to implement electrical conduction between the positive electrode plate and the negative electrode plate, giving rise to safety problems. In addition, if the pressure between the protruding portion and the housing is excessive, the housing is prone to deform, thereby impairing the appearance of the housing and airtightness of the battery cell.

In view of this, an embodiment of this application provides a technical solution. By forming a first recessed portion on the end cap at a position corresponding to the protruding portion, this application releases the stress while the protruding portion extends into the housing. The first recessed portion reduces strength of the protruding portion. In this way, when the protruding portion squeezes the inner surface of the housing, the protruding portion is able to release the stress by deforming, reduce an extrusion force and friction between the protruding portion and the housing, reduce resulting particles, reduce the risk of deformation of the housing, and improve the safety performance of the battery cell.

The technical solution described in this embodiment of this application is applicable to a battery and an electrical device that uses the battery.

The electrical device may be a vehicle, a mobile phone, a portable device, a notebook computer, a ship, a spacecraft, an electric toy, a power tool, or the like. The vehicle may be an oil-fueled vehicle, a natural gas vehicle, or a new energy vehicle. The new energy vehicle may be a battery electric vehicle, a hybrid electric vehicle, a range-extended electric vehicle, or the like. The spacecraft includes an airplane, a rocket, a space shuttle, a spaceship, and the like. The electric toy includes a fixed or mobile electric toy, such as a game console, an electric car toy, an electric ship toy, an electric airplane toy, and the like. The power tool includes an electrical metal cutting tool, an electrical grinding tool, an electrical assembling tool, and a power tool for use in railways. Examples of the power tool are an electrical drill, an electrical grinder, an electrical wrench, an electrical screwdriver, an electrical hammer, an electrical impact drill, a concrete vibrator, an electrical planer, and the like. Embodiments of this application do not particularly limit the electrical device.

For ease of description in the following embodiments, a vehicle is used as an example of the electrical device.

FIG. 1 is a schematic structural diagram of a vehicle according to some embodiments of this application.

As shown in FIG. 1, a battery 2 is disposed inside the vehicle 1. The battery 2 may be disposed at the bottom, front, or rear of the vehicle 1. The battery 2 may be configured to supply power to the vehicle 1. For example, the battery 2 may serve as an operating power supply of the vehicle 1.

The vehicle 1 may further include a controller 3 and a motor 4. The controller 3 is configured to control the battery 2 to supply power to the motor 4, for example, to start or navigate the vehicle 1, or meet the operating power requirements of the vehicle in operation.

In some embodiments of this application, the battery 2 serves not only as an operating power supply of the vehicle 1, but may also serve as a drive power supply of the vehicle 1 to provide driving power for the vehicle 1 in place of or partly in place of oil or natural gas.

Figure 2:
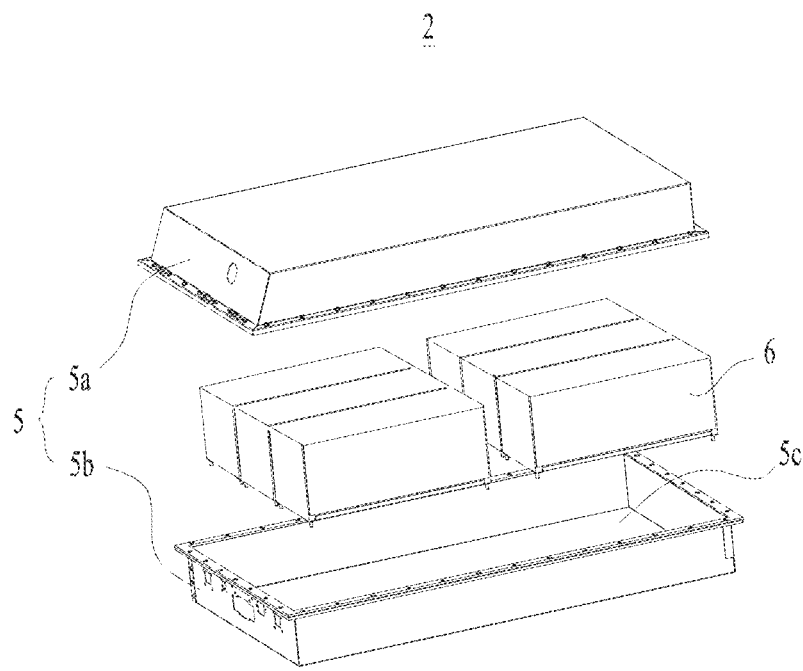
FIG. 2 is a schematic exploded view of a battery according to some embodiments of this application.

FIG. 2 is a schematic exploded view of a battery according to some embodiments of this application.

As shown in FIG. 2, the battery 2 includes a box 5 and a battery cell. The battery cell is accommodated in the box 5.

The box 5 is configured to accommodate the battery cell. The box 5 may be one of various structures. In some embodiments, the box 5 may include a first box portion 5a and a second box portion 5b. The first box portion 5a and the second box portion 5b fit and cover each other. The first box portion 5a and the second box portion 5b together define an accommodation space 5c configured to accommodate the battery cell. The second box portion 5b may be a hollowed-out structure that is opened at one end. The first box portion 5a is a plate-like structure. The first box portion 5a fits on the opening side of the second box portion 5b to form the box 5 that includes the accommodation space 5c. The first box portion 5a and the second box portion 5b each may be a hollowed-out structure that is opened at one end. The opening end of the first box portion 5a fits on the opening end of the second box portion 5b, so as to form the box 5 with the accommodation space 5c. Definitely, the first box portion 5a and the second box portion 5b may be in various shapes, such as a cylinder or a cuboid.

To improve airtightness between the first box portion 5a and the second box portion 5b that are connected, a sealing element such as a sealant or a sealing ring may be disposed between the first box portion 5a and the second box portion 5b.

Assuming that the first box portion 5a fits on the top of the second box portion 5b, the first box portion 5a may also be referred to as an upper box, and the second box portion 5b may also be referred to as a lower box.

There may be one or more battery cells in the battery 2. If there are a plurality of battery cells, the plurality of battery cells may be connected in series, parallel, or series-and-parallel pattern. The series-and-parallel pattern means a combination of series connection and parallel connection of the plurality of battery cells. The plurality of battery cells may be directly connected in series, parallel, or series-and-parallel pattern, and then the whole of the plurality of battery cells may be accommodated in the box 5. Alternatively, the plurality of battery cells may be connected in series, parallel, or series-and-parallel pattern to form a battery module 6, and then a plurality of battery modules 6 are connected in series, parallel, or series-and-parallel pattern to form a whole for being accommodated in the box 5.

Figure 3:
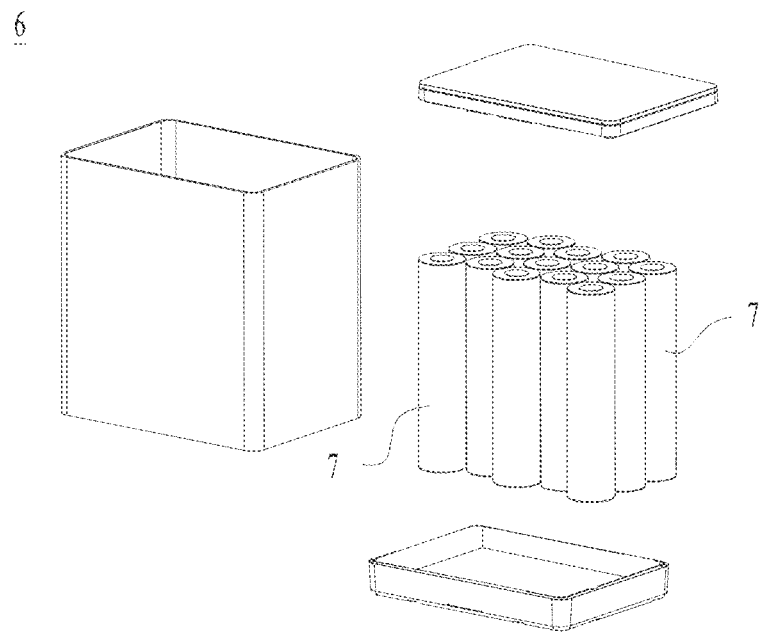
FIG. 3 is a schematic exploded view of the battery module shown in FIG. 2.

FIG. 3 is a schematic exploded view of the battery module shown in FIG. 2.

In some embodiments, as shown in FIG. 3, there are a plurality of battery cells 7. The plurality of battery cells 7 are connected in series, parallel, or series-and-parallel pattern to form a battery module 6 first. A plurality of battery modules 6 are then connected in series, parallel, or series-and-parallel pattern to form a whole for being accommodated in the box.

The plurality of battery cells 7 in the battery module 6 may be electrically connected by a busbar component, so as to implement parallel connection, series connection, or series-parallel connection between the plurality of battery cells 7 in the battery module 6.

Figure 4:
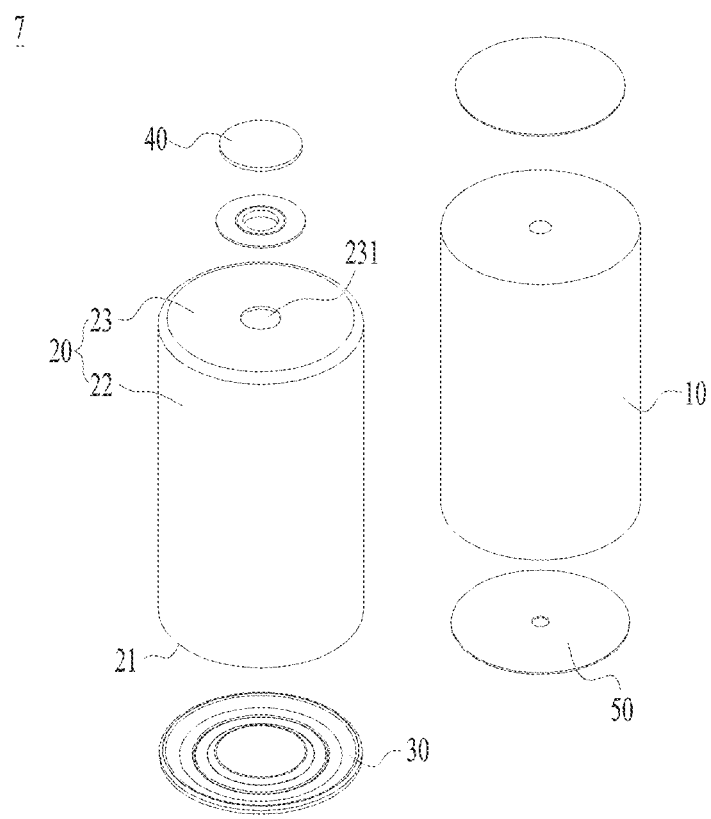
FIG. 4 is a schematic exploded view of a battery cell according to some embodiments of this application.
Figure 5:
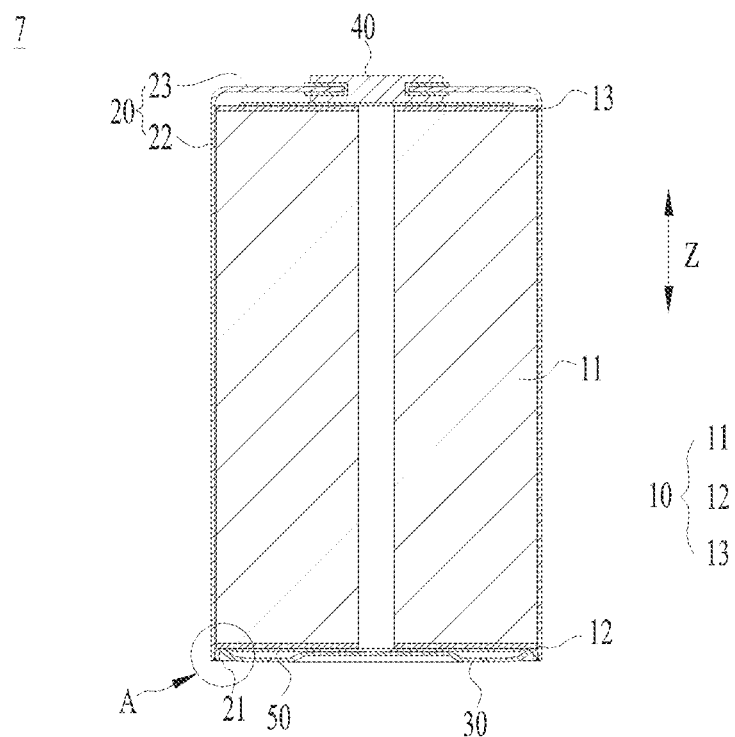
FIG. 5 is a schematic sectional view of a battery cell according to some embodiments of this application.

FIG. 4 is a schematic exploded view of a battery cell according to some embodiments of this application; FIG. 5 is a schematic sectional view of a battery cell according to some embodiments of this application; and FIG. 6 is a close-up view of a circled position A of the battery cell shown in FIG. 5.

Figure 6:
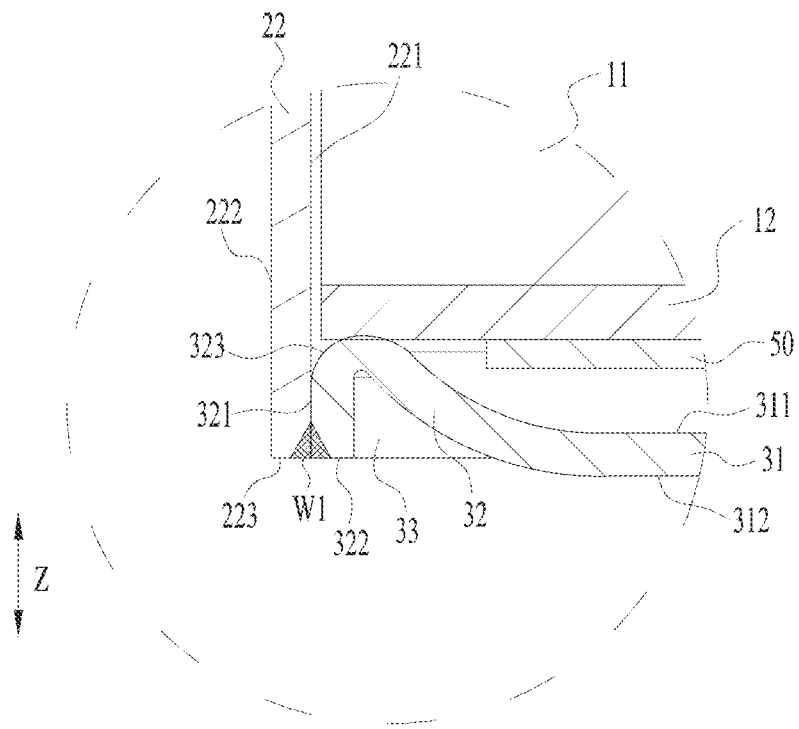
FIG. 6 is a close-up view of a circled position A of the battery cell shown in FIG. 5.

As shown in FIG. 4 to FIG. 6, the battery cell 7 according to an embodiment of this application includes: a housing 20, on which an opening 21 is made; an electrode assembly 10, accommodated in the housing 20; and an end cap 30, configured to fit and cover the opening 21. The end cap 30 includes a cap body 31 and a protruding portion 32 around the cap body 31. The protruding portion 32 protrudes from an inner surface 311 of the cap body toward the electrode assembly 10. At least a part of the protruding portion 32 is located in the housing 20 and configured to fit with the housing 20. A recessed portion 33 is formed on the end cap 30 at a position corresponding to the protruding portion 32. The recessed portion 33 is recessed from an outer surface 312 of the cap body toward the electrode assembly 10 and configured to release a stress while the protruding portion 32 extends into the housing 20.

The electrode assembly 10 includes a first electrode plate, a second electrode plate, and a separator. The separator is configured to separate the first electrode plate from the second electrode plate. The first electrode plate and the second electrode plate are of opposite polarities. In other words, one of the first electrode plate or the second electrode plate is a positive electrode plate, and the other of the first electrode plate or the second electrode plate is a negative electrode plate.

Optionally, the first electrode plate, the second electrode plate, and the separator are all ribbon-shaped structures. The first electrode plate, the second electrode plate, and the separator are wound into one piece to form a jelly-roll structure. The jelly-roll structure may be a cylindrical structure, a flat structure, or other shaped structures.

The housing 20 is a hollowed-out structure opened at one end. The end cap 30 fits on, and is hermetically connected to, the opening of the housing 20, to form an accommodation cavity configured to accommodate the electrode assembly 10 and the electrolytic solution.

The housing 20 is a structure hollowed out to form a space configured to accommodate the electrode assembly 10. The housing 20 may be in various shapes such as a cylinder or cuboid. The shape of the housing 20 may be determined depending on the specific shape of the electrode assembly 10. For example, if the electrode assembly 10 is a cylindrical structure, the housing may be a cylindrical housing. If the electrode assembly 10 is a cuboidal structure, the housing may be a cuboidal housing.

The housing 20 may be positively charged, negatively charged, or uncharged. To make the housing 20 charged, the housing 20 may be directly connected to the electrode plate of the electrode assembly 10, or may be electrically connected to the electrode plate through other conductive members.

Optionally, the end cap 30 and the housing 20 may be connected by welding, so that the end cap 30 and the housing 20 may possess basically the same potential. Illustratively, to make the housing 20 positively charged, the housing 20 may be electrically connected to the positive electrode plate by using the end cap 30. To make the housing 20 negatively charged, the housing 20 may be electrically connected to the negative electrode plate by using the end cap 30. Definitely, the housing 20 may be connected to the electrode plate by other conductive structures instead, without being limited in this embodiment.

The end cap 30 may be electrically connected to the electrode assembly 10, or may be insulated from the electrode assembly 10. Optionally, the end cap 30 is electrically connected to the first electrode plate. Definitely, the end cap 30 may be directly electrically connected to the first electrode plate, or may be electrically connected to the first electrode plate by other members.

The housing 20 and the end cap 30 may be made of the same material, or made of different materials.

The cap body 31 is a plate-like structure, and includes an inner surface and an outer surface that are disposed opposite to each other along the thickness direction Z. The inner surface 311 of the cap body faces the electrode assembly 10. Optionally, the cap body 31 is a flat plate. The inner surface 311 of the cap body and the outer surface 312 of the cap body are both planes and parallel to each other.

The protruding portion 32 is an annular structure around the cap body 31.

The protruding portion 32 protrudes toward the electrode assembly 10 against the inner surface 311 of the cap body, so that at least a part of the protruding portion 32 protrudes from the inner surface 311 of the cap body. The protruding portion 32 may entirely protrude into the housing 20, or just partly protrude into the housing 20, without being limited in this embodiment.

The part of the protruding portion 32, which protrudes into the housing 20, may be in interference fit, clearance fit, or transition fit with the housing 20, without being limited in this embodiment.

The position of the recessed portion 33 corresponds to the position of the protruding portion 32. The recessed portion 33 is recessed toward the electrode assembly 10 against the outer surface 312 of the cap body. The recessed portion 33 reduces the strength of the protruding portion 32, so that the region corresponding to the protruding portion 32 on the end cap 30 is more elastic.

In this embodiment, in a process of fitting the end cap 30 onto the housing 20, the protruding portion 32 is able to extend into the housing 20 and fit with the housing 20 to limit the position of the end cap 30, thereby reducing the difficulty of positioning the housing 20 and the end cap 30 and improving the assembling efficiency of the battery cell 7. The housing 20 is able to limit the position of the end cap 30 by using the protruding portion 32. In this way, offset and misalignment between the end cap 30 and the housing 20 are reduced in a process of connecting the end cap 30 and the housing 20, and the sealing performance is improved. The recessed portion 33 reduces strength of the protruding portion 32. In this way, when the protruding portion 32 and the housing 20 squeeze each other, the protruding portion 32 is able to release the stress by deforming, reduce an extrusion force and friction between the protruding portion 32 and the housing 20, reduce resulting particles, reduce the risk of deformation of the housing 20, and improve the safety performance of the battery cell 7.

In some embodiments, in a thickness direction Z of the end cap 30, a bottom face of the recessed portion 33 is closer to the electrode assembly 10 than the entire inner surface 311 of the cap body.

This embodiment ensures a sufficient depth of the first recessed portion 33 to increase the amount by which the protruding portion 32 protrudes beyond the inner surface 311 of the cap body. This improves the effect of the fit between the protruding portion 32 and the housing 20, and increases elasticity of the protruding portion 32, thereby reducing the extrusion force and friction between the protruding portion 32 and the housing 20, reducing the resulting particles, reducing the risk of deformation of the housing 20, and improving the safety performance of the battery cell 7.

In some embodiments, the cap body 31 may be an annular flat plate structure, and the end cap 30 may further include a part surrounded by the cap body 31.

In some embodiments, the housing 20 is welded to the end cap 30. The welding not only implements the connection between the housing 20 and the end cap 30, but also ensures airtightness.

In some embodiments, viewed from the appearance of the electrode assembly 10, the electrode assembly 10 includes a body portion 11, a first tab 12, and a second tab 13. The first tab 12 and the second tab 13 protrude from the body portion 11. The first tab 12 is a part uncoated with the active material layer on the first electrode plate, and the second tab is a part uncoated with the active material layer on the second electrode plate. Correspondingly, one of the first tab 12 or the second tab 13 is a positive tab, and the other is a negative tab.

The first tab 12 and the second tab 13 may extend from the same end of the body portion 11, or extend from two opposite ends of the body portion respectively.

Illustratively, the first tab 12 and the second tab 13 are disposed at two ends of the body portion 11 respectively. In other words, the first tab 12 and the second tab 13 are disposed at the two ends of the electrode assembly 10 respectively. Optionally, the first tab 12 is located at an end that is of the electrode assembly 10 and that is oriented toward the end cap 30. The second tab 13 is located at an end that is of the electrode assembly 10 and that is oriented away from the end cap 30.

Optionally, the first tab 12 is wound around a central axis of the electrode assembly 10 in a plurality of circles. In other words, the first tab 12 includes a plurality of tab layers. After completion of the winding, the first tab 12 is in the shape of a column approximately, and a gap is left between two adjacent tab layers. In this embodiment of this application, the first tab 12 may be processed to reduce the gap between the tab layers and facilitate the connection between the first tab 12 and other conductive structures. For example, in this embodiment of this application, the first tab 12 may be kneaded and flattened, so that an end region that is of the first tab 12 and that is far away from the body portion 11 can be tucked and collected together. The kneading and flattening lead to formation of a densified end face at the end that is of the first tab 12 and that is far away from the body portion 11, thereby reducing the gap between the tab layers and facilitating the connection between the first tab 12 and other conductive structures. Alternatively, in this embodiment of this application, a conductive material may fill the gap between the two adjacent tab layers to reduce the gap between the tab layers.

Optionally, the second tab 13 is wound around the central axis of the electrode assembly 10 in a plurality of circles, so that the second tab 13 includes a plurality of tab layers. Illustratively, the second tab 13 is also kneaded and flattened to reduce the gap between the tab layers of the second tab 13.

In some embodiments, the first tab 12 is disposed at the end that is of the electrode assembly 10 and that is oriented toward the end cap 30. The first tab 12 is electrically connected to the end cap 30.

The end cap 30 may be directly connected to the first tab 12. For example, the end cap 30 may be directly welded to the first tab 12 to implement electrical connection between the end cap 30 and the first tab 12. Alternatively, the end cap 30 may be indirectly connected to the first tab 12 by other conductive structures (such as a current collecting member or structure 50) instead.

In this embodiment, the potential of the end cap 30 may be basically the same as the potential of the first tab 12, so that the end cap 30 may serve as an output electrode of the battery cell 7, thereby saving a conventional electrode terminal and simplifying the structure of the battery cell 7.

In some embodiments, the first tab 12 of the electrode assembly 10 is electrically connected to the housing 20 by the end cap 30.

In this embodiment, the housing 20 is connected to the first tab 12 of the electrode assembly 10 by the end cap 30, so that the potential of the housing 20 is basically the same as the potential of the first tab 12. In this way, the housing 20 itself may serve as an output electrode of the battery cell 7, thereby saving a conventional electrode terminal and simplifying the structure of the battery cell 7. When a plurality of battery cells 7 are assembled into a group, the housing 20 may be electrically connected to a busbar component, thereby not only increasing the passage area, but also making the structural design of the busbar component more flexible.

In some embodiments, the housing 20 includes a sidewall 22 and a bottom wall 23. The sidewall 22 extends along a thickness direction Z of the end cap 30 and is disposed around the electrode assembly 10. The bottom wall 23 is connected to one end of the sidewall 22 and located on a side that is of the electrode assembly 10 that is oriented away from the end cap 30. An electrode lead-out hole 231 is disposed on the bottom wall 23. A second tab 13 is disposed on the electrode assembly 10 at an end oriented toward the bottom wall 23, and the first tab 12 and the second tab 13 are of opposite polarities. The battery cell 7 further includes an electrode terminal 40 mounted in the electrode lead-out hole 231, and the electrode terminal 40 is electrically connected to the second tab 13.

The sidewall 22 and the bottom wall 23 may be an integrally formed structure. That is, the housing 20 is an integrally formed member. Definitely, the sidewall 22 and the bottom wall 23 may be two stand-alone members provided separately, and may be connected together by welding, riveting, bonding, or other means.

The sidewall 22 is a cylindrical structure. For example, the sidewall 22 is a cylinder or a rectangular column. The bottom wall 23 is a plate-like structure, the shape of which corresponds to the shape of the sidewall 22. Optionally, an opening 21 is formed at one end of the sidewall 22. The bottom wall 23 is connected to the other end that is of the sidewall 22 and that is oriented away from the opening 21.

The second tab 13 may be directly electrically connected to the electrode terminal 40, or may be indirectly electrically connected to the electrode terminal 40 by other conductive structures.

The electrode terminal 40 is dielectrically disposed on the bottom wall 23. The electrode terminal 40 and the bottom wall 23 may be of different polarities. The electrode terminal 40 and the bottom wall 23 may serve as two output electrodes of the battery cell 7 respectively. Optionally, the battery cell 7 further includes an insulation piece. At least a part of the insulation piece is located between the bottom wall 23 and the electrode terminal 40, so as to insulate the bottom wall 23 from the electrode terminal 40.

In a case that the first tab 12 is a negative tab and the second tab 13 is a positive tab, the bottom wall 23 is a negative output electrode of the battery cell 7, and the electrode terminal 40 is a positive output electrode of the battery cell 7. In a case that the first tab 12 is a positive tab and the second tab 13 is a negative tab, the bottom wall 23 is a positive output electrode of the battery cell 7, and the electrode terminal 40 is a negative output electrode of the battery cell 7.

The electrode terminal 40 is fixed onto the bottom wall 23. The electrode terminal 40 may be fixed as a whole onto the outer side of the bottom wall 23, or may extend into the interior of the housing 20 through the electrode lead-out hole 231.

The first tab 12 is located at the end that is of the electrode assembly 10 and that is oriented toward the end cap 30, so as to facilitate electrical connection between the end cap 30 and the first tab 12. Correspondingly, the second tab 13 is located at the end that is of the electrode assembly 10 and that is oriented toward the bottom wall 23, so as to facilitate electrical connection between the electrode terminal 40 and the second tab 13. In this embodiment of this application, the first tab 12 and the second tab 13 are disposed at the two ends of the electrode assembly 10 respectively, thereby reducing the risk of conduction between the first tab 12 and the second tab 13, and increasing the passage area of both the first tab 12 and the second tab 13.

In this embodiment, the bottom wall 23 and the electrode terminal 40 may serve as two output electrodes of the battery cell 7, thereby simplifying the structure of the battery cell 7 and ensuring a high flow capacity of the battery cell 7. The bottom wall 23 and the electrode terminal 40 are located at the same end of the battery cell 7. In this way, the busbar component can be assembled onto the same side of the battery cell 7, thereby simplifying the assembling process and improving the efficiency of assembling a plurality of battery cells 7 into groups.

In some embodiments, the bottom wall 23 and the sidewall 22 are a one-piece structure. This embodiment avoids the step of connecting the bottom wall 23 and the sidewall 22, and reduces the resistance between the bottom wall and the sidewall. For example, the housing 20 may be formed by a stretching process.

The electrode lead-out hole 231 in this embodiment of this application is made after the housing 20 is formed by stretching.

The inventor hereof has tried an opening end of a housing that is made by calendering, so that the opening end of the housing is folded inward to form a flanged structure. The flanged structure presses the end cap to fix the end cap. The inventor mounts the electrode terminal onto the end cap, and uses the flanged structure and the electrode terminal as the two output electrodes of the battery cell respectively. However, the larger the size of the flanged structure, the higher the risk of curling and wrinkling the flanged structure after the flanged structure is formed. The curling and wrinkling of the flanged structure lead to a bumpy surface of the flanged structure and, when the flanged structure is welded to the busbar component, result in poor welding. Therefore, the size of the flanged structure is relatively limited, resulting in an insufficient flow capacity of the battery cell.

In this embodiment, an electrode lead-out hole 231 configured to mount the electrode terminal 40 is formed on the bottom wall 23 by use of a hole-opening process, so as to dispose the positive output electrode and the negative output electrode at the end that is of the battery cell 7 and that is oriented away from the opening 21. The bottom wall 23 is formed during the formation of the housing 20, so as to ensure flatness of the bottom wall 23 and high connection strength between the bottom wall 23 and the busbar component after the electrode lead-out hole 231 is made. At the same time, the flatness of the bottom wall 23 is not restricted by the size of the bottom wall. Therefore, the size of the bottom wall 23 may be relatively large, thereby improving the flow capacity of the battery cell 7.

In some embodiments, the first tab 12 is a negative tab, and a substrate material of the housing 20 is steel.

The housing 20 is electrically connected to the negative tab. That is, the housing 20 is in a low-potential state. The steel housing 20 in the low-potential state is not prone to corrosion by an electrolytic solution, thereby reducing safety hazards.

In some embodiments, the substrate material of the housing 20 is identical to the substrate material of the end cap 30. Optionally, both the substrate material of the housing 20 and the substrate material of the end cap 30 are steel.

In this embodiment, the substrate material of the housing 20 is identical to the substrate material of the end cap 30, thereby ensuring the welding strength between the housing 20 and the end cap 30, and improving the airtightness of the battery cell 7.

In some embodiments, the battery cell is a cylindrical cell. Correspondingly, the electrode assembly 10 is a cylindrical structure, and the housing 20 is a cylindrical hollowed-out structure.

In some embodiments, the protruding portion 32 may directly support the first tab 12, or support the first tab 12 through other members.

In some embodiments, the protruding portion 32 abuts on the first tab 12 of the electrode assembly 10 to support the first tab 12.

In this embodiment, the protruding portion 32 is able to support the first tab 12, thereby reducing the shaking amplitude of the electrode assembly 10 during vibration of the battery cell 7, and improving stability of the electrode assembly 10.

In some embodiments, the protruding portion is welded to the first tab to electrically connect the first tab and the end cap.

In this embodiment, the protruding portion 32 may be directly welded to the first tab 12 without requiring other adapters, thereby simplifying the structure of the battery cell 7. In this embodiment, the thickness of the protruding portion 32 is reduced by the recessed portion 33, thereby reducing the welding power required for welding the protruding portion 32 to the first tab 12, reducing heat emission, and reducing the risk of burning other components.

In some embodiments, the protruding portion 32 is configured to fit with the housing 20 to limit the position of the end cap 30 in a radial direction.

The housing 20 possesses a central axis, and the sidewall 22 is disposed around the central axis. The central axis of the housing 20 extends along the thickness direction Z of the end cap 30. In the description of this application, the radial direction is a direction perpendicular to the thickness direction Z and passing through the central axis.

The radial direction referred to herein is applicable to cylindrical cells. In a cylindrical cell, the electrode assembly 10 is a cylindrical structure, the housing 20 is a cylindrical hollowed-out structure, and the end cap 30 is a round plate structure. For a cylindrical cell, the "radial direction" may be a radius direction of the housing 20.

Definitely, the radial direction referred to herein is also applicable to a prismatic cell. In a prismatic cell, the electrode assembly 10 is a flat structure, the housing 20 is a rectangular hollowed-out structure, and the end cap 30 is a rectangular plate-like structure.

In some embodiments, the sidewall 22 of the housing 20 extends along the thickness direction Z of the end cap 30 and is disposed around the electrode assembly 10. An inner wall face 221 of the sidewall and an outer peripheral face 321 of the protruding portion are both parallel to the thickness direction Z, and are disposed opposite to each other.

The sidewall 22 of the housing 20 includes an inner wall face and an outer wall face disposed opposite to each other. The inner wall face 221 of the sidewall faces the electrode assembly 10. Both the inner wall face 221 of the sidewall and the outer wall face 222 of the sidewall are column faces. The inner wall face 221 of the sidewall is a curved face formed by parallel movement of a first generatrix along a preset trajectory. Optionally, the inner wall face 221 is a cylindrical face. That is, the inner wall face 221 of the sidewall is a curved face formed by parallel movement of the first generatrix along a circular trajectory. Optionally, the outer wall face 222 of the sidewall is also a cylindrical face.

The outer peripheral face 321 of the protruding portion is a column face. The outer peripheral face 321 of the protruding portion is a curved face formed by parallel movement of a second generatrix along a preset trajectory. Optionally, the outer peripheral face 321 of the protruding portion is a cylindrical face.

When the first generatrix is parallel to the second generatrix, the outer peripheral face 321 of the protruding portion is parallel to the inner wall face 221 of the sidewall. Illustratively, both the first generatrix and the second generatrix are straight lines parallel to the thickness direction Z.

The inner wall face 221 of the sidewall surrounds the outer peripheral face 321 of the protruding portion. In this way, after the protruding portion 32 extends into the housing 20, the inner wall face 221 of the sidewall can limit the position of the end cap 30 through the outer peripheral face 321 of the protruding portion.

In this embodiment, the inner wall face 221 of the sidewall is parallel to the outer peripheral face 321 of the protruding portion. In this way, when the inner wall face 221 of the sidewall and the outer peripheral face 321 of the protruding portion contact and squeeze each other, the force exerted between the inner wall face of the sidewall and the outer peripheral face of the protruding portion is relatively uniform, thereby reducing stress concentration, and reducing deformation of the housing 20 and the protruding portion 32.

In some embodiments, the sidewall 22 of the housing 20 is in interference fit with the protruding portion 32 so that the inner wall face 221 of the sidewall abuts against the outer peripheral face 321 of the protruding portion.

The part of the protruding portion 32, which protrudes into the housing 20, may be entirely in interference fit with the housing 20 or partly in interference fit with the housing 20.

Using an example in which both the outer peripheral face 321 of the protruding portion and the inner wall face 221 of the sidewall are cylindrical faces, before the end cap 30 is fitted onto the housing 20, the diameter of the outer peripheral face 321 of the protruding portion is greater than the diameter of the inner wall face 221 of the sidewall. In this way, after the protruding portion 32 extends into the housing 20, the part by which the protruding portion 32 extends into the housing 20 is in interference fit with the housing 20.

In this embodiment, the interference fit increases connection strength between the housing 20 and the end cap 30, and improves the sealing performance. In this embodiment, the strength of the protruding portion 32 is reduced by the recessed portion 33, so that the force exerted between the protruding portion 32 and the housing 20 is reduced while the protruding portion 32 extends into the housing 20. In this way, even if the housing 20 is in interference fit with the protruding portion 32, the resulting particles can be reduced, the risk of deformation of the housing 20 can be reduced, and the safety performance of the battery cell 7 can be improved.

In some embodiments, the inner wall face 221 of the sidewall is welded to the outer peripheral face 321 of the protruding portion to form a first weld portion W1. In the thickness direction Z that extends away from the electrode assembly 10, the first weld portion W1 does not extend beyond the outer surface 312 of the cap body.

Optionally, the protruding portion 32 and the sidewall 22 are connected by laser welding. In welding the protruding portion 32 to the sidewall 22, a laser beam is irradiated on the junction between the outer peripheral face 321 of the protruding portion and the inner wall face 221 of the sidewall. The laser beam melts and connects together at least a part of the outer peripheral face 321 of the protruding portion and a part of the inner wall face 221 of the sidewall.

In this embodiment, the first weld portion W1 closes the opening 21 to implement sealing and reduce the risk of leaking the electrolytic solution from the gap between the outer peripheral face 321 of the protruding portion and the inner wall face 221 of the side wall.

In welding the protruding portion 32 to the housing 20, if the protruding portion 32 is in interference fit with the housing 20, no external device is required for fixing the end cap 30, thereby simplifying the assembling process. In addition, the outer peripheral face 321 of the protruding portion abuts on the inner wall face 221 of the sidewall, thereby reducing the risk of burning the electrode assembly 10 by the laser beam irradiated into the housing 20. The interference fit can also block gaseous by-products generated by the welding, reduce the gaseous by-products passing between the outer peripheral face 321 of the protruding portion and the inner wall face 221 of the sidewall, and reduce the risk of burning the separator of the electrode assembly.

In this embodiment, in the thickness direction Z that extends away from the electrode assembly 10, an exposed surface of the first weld portion W1 does not extend beyond the outer surface 312 of the cap body.

The cap body 31 may serve as a load-bearing structure of the battery cell 7. After the battery cell 7 is mounted into an electrical device, an external support structure is able to support the battery cell 7 through the cap body 31. In this embodiment, the first weld portion W1 does not extend beyond the outer surface 312 of the cap body in the direction oriented away from the electrode assembly 10, thereby reducing the force between the external support structure and the first weld portion W1, reducing the risk of rupturing the first weld portion W1, and ensuring high connection strength and sealing performance between the housing 20 and the end cap 30.

In some embodiments, the sidewall 22 includes a first outer end face 223 around the opening 21, and the first outer end face 223 is connected to the inner wall face 221 of the sidewall. In the thickness direction Z, the protruding portion 32 includes a second outer end face 322 at an end oriented away from the electrode assembly 10. The second outer end face 322 is connected to the outer peripheral face 321 of the protruding portion. The first outer end face 223 is flush with the second outer end face 322. The first outer end face 223 and the second outer end face 322 are closer to the electrode assembly 10 than the outer surface 312 of the cap body.

The first outer end face 223 connects the inner wall face 221 of the sidewall and the outer wall face 222 of the sidewall. One end that is of the second outer end face 322 and that is oriented away from the outer peripheral face 321 of the protruding portion is connected to a side wall face of the recessed portion 33.

Optionally, both the first outer end face 223 and the second outer end face 322 are perpendicular to the inner wall face 221 of the sidewall and the outer peripheral face 321 of the protruding portion.

The first weld portion W1 formed by the welding is bumpy and rough, and may protrude from the first outer end face 223 and the second outer end face 322. If the first outer end face 223 is flush with the outer surface 312 of the cap body, the first weld portion W1 may serve as a load-bearing part of the battery cell 7, posing a risk of rupturing the first weld portion W1.

This embodiment makes the first outer end face 223 and the second outer end face 322 closer to the electrode assembly 10 than the outer surface 312 of the cap body. In this way, even if the first weld portion W1 protrudes beyond the first outer end face 223 and the second outer end face 322, the first weld portion W1 is still prevented from extending beyond the outer surface 312 of the cap body in the direction oriented away from the electrode assembly 10, thereby reducing the force exerted on the first weld portion W1, reducing the risk of rupturing the first weld portion W1, and ensuring high connection strength and sealing performance between the housing 20 and the end cap 30.

In some embodiments, the protruding portion 32 further includes a guide face 323 oriented toward the sidewall 22. The guide face 323 is connected to an end that is the outer peripheral face 321 of the protruding portion and that is close to the electrode assembly 10. The guide face 323 tilts away from the inner wall face 221 of the sidewall against the outer peripheral face 321 of the protruding portion to guide the protruding portion 32 to extend into the housing 20.

The guide face 323 is spaced apart from the inner wall face 221 of the sidewall. In the direction pointing to the electrode assembly 10 from the end cap 30, the spacing between the guide face 323 and the inner wall face 221 of the sidewall along the radial direction increases gradually.

By disposing a tilting guide face 323 on the protruding portion 32 in this embodiment, the protruding portion 32 can be guided into the housing 20 in a process of fitting the end cap 30 onto the housing 20 (especially when the protruding portion 32 is in interference fit with the housing 20), thereby simplifying the assembling process and improving the assembling efficiency.

Figure 7:
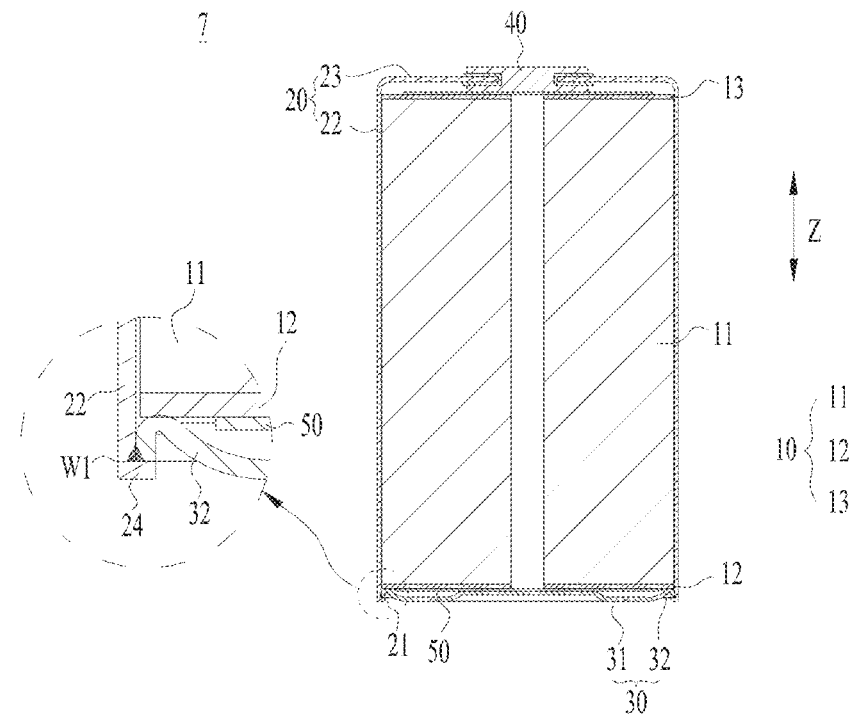
FIG. 7 is a schematic sectional view of a battery cell according to other embodiments of this application.

FIG. 7 is a schematic sectional view of a battery cell according to other embodiments of this application.

In some embodiments, the housing 20 further includes a flanged portion 24. The flanged portion 24 is connected to the sidewall 22 and bent toward the cap body 31 against the sidewall 22 to cover the first weld portion W1.

The flanged portion 24 and the sidewall 22 are a one-piece structure and is formed by a flanging process.

An opening 21 is formed at an end that is of the flanged portion 24 and that is oriented away from the sidewall 22.

In a process of fitting the end cap 30 onto the housing 20, the protruding portion 32 of the end cap 30 is inserted into the housing 20, and then the protruding portion 32 is welded to the sidewall 22 to form a first weld portion W1. After completion of the welding, a part of the housing 20, which is located close to the opening 21, is calendered to form a flanged portion 24 that covers the first weld portion W1.

In this embodiment, the flanged portion 24 is able to protect the first weld portion W1, reduce the risk of corroding and damaging the first weld portion W1, and ensure high connection strength and sealing performance between the housing 20 and the end cap 30.

In some embodiments, a surface that is of the flanged portion 24 and that is oriented away from the electrode assembly 10 is flush with the outer surface of the cap body.

Figure 8:
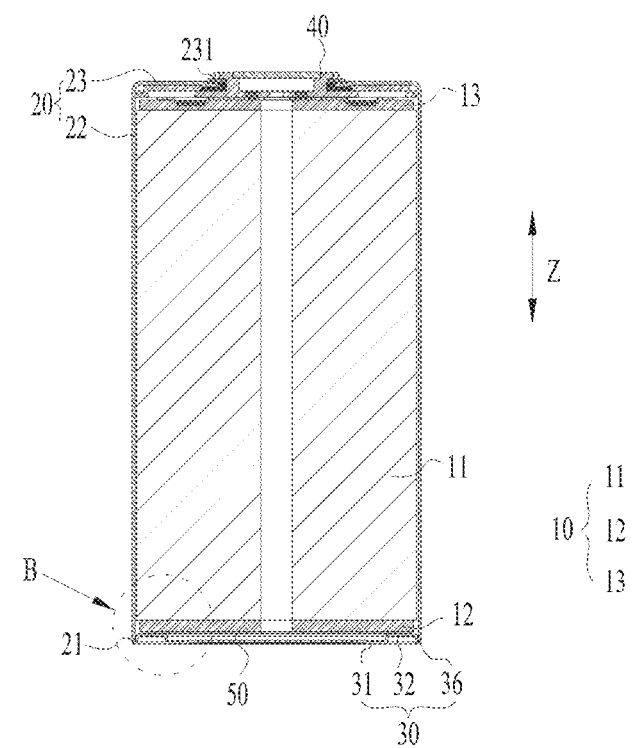
FIG. 8 is a schematic sectional view of a battery cell according to still other embodiments of this application.
Figure 9:
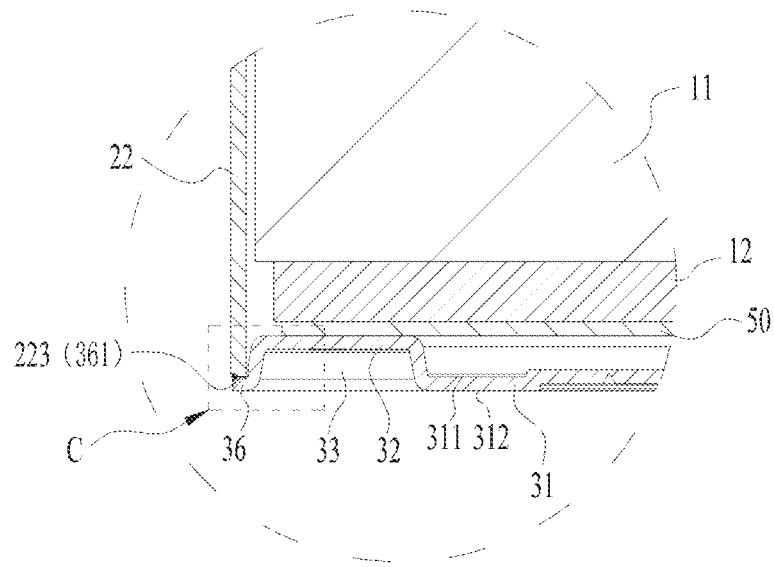
FIG. 9 is a close-up view of a circled position B of the battery cell shown in FIG. 8.

FIG. 8 is a schematic sectional view of a battery cell according to still other embodiments of this application; FIG. 9 is a close-up view of a circled position B of the battery cell shown in FIG. 8; and FIG. 10 is a close-up view of a rectangular position C shown in FIG. 9.

Figure 10:
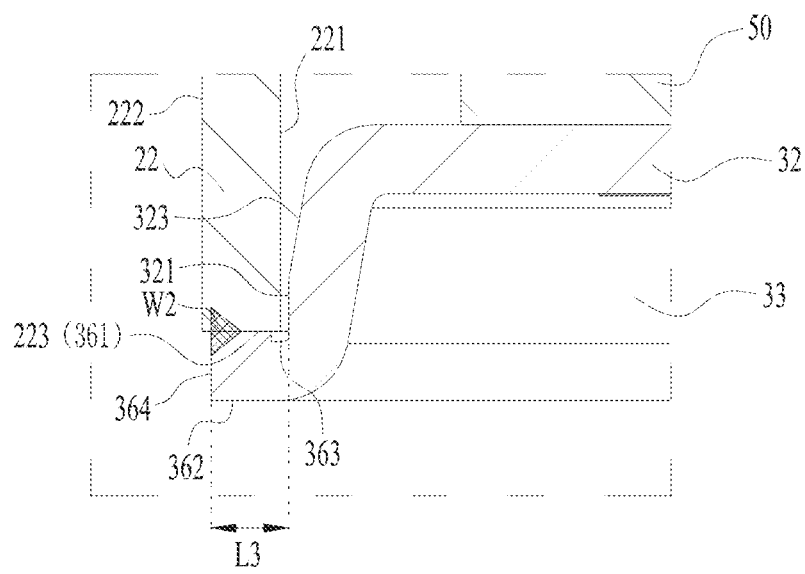
FIG. 10 is a close-up view of a rectangular position C shown in FIG. 9.

As shown in FIG. 8 to FIG. 10, in some embodiments, the end cap 30 further includes an extension portion 36 protruding beyond the outer peripheral face 321 of the protruding portion and surrounding the protruding portion 32. An inner surface 361 of the extension portion is welded to a first outer end face 223 of the sidewall 22 around the opening, so that the housing 20 and the end cap 30 are connected into one piece.

The extension portion 36 includes an inner surface and an outer surface that are disposed opposite to each other along the thickness direction Z. The inner surface 361 of the extension portion faces the electrode assembly 10. Optionally, the extension portion 36 is an annular flat plate structure. The inner surface 361 of the extension portion and the outer surface 362 of the extension portion are both planes.

The extension portion 36 and the sidewall 22 are arranged along the thickness direction Z. The inner surface 361 of the extension portion may be parallel to the first outer end face 223.

Optionally, in welding the extension portion 36 to the sidewall 22, the laser beam is irradiated at a junction between the first outer end face 223 and the inner surface 361 of the extension portion. After completion of welding, at least a part of the inner surface 361 of the extension portion and at least a part of the first outer end face 223 are melted and joined together.

The inner surface 361 of the extension portion is welded to the first outer end face 223 of the sidewall 22 to form a second weld portion W2.

The first outer end face 223 is located at an outermost end of the housing 20. In this embodiment, the inner surface 361 of the extension portion abuts on the first outer end face 223.

In this embodiment, in a process of fitting the end cap 30 onto the housing 20, the first outer end face 223 serves a function of limiting the position in the thickness direction Z of the end cap 30, thereby reducing the risk of excessive insertion of the end cap 30 into the housing 20, and improving the efficiency of assembling.

In some embodiments, the protruding portion 32 is in clearance fit with the housing 20 to form a clearance between the outer peripheral face 321 of the protruding portion and the inner wall face 221 of the sidewall.

Using an example in which both the outer peripheral face 321 of the protruding portion and the inner wall face 221 of the sidewall are cylindrical faces, before the end cap 30 is fitted onto the housing 20, the diameter of the outer peripheral face 321 of the protruding portion is less than the diameter of the inner wall face 221 of the sidewall. In this way, after the protruding portion 32 extends into the housing 20, the part by which the protruding portion 32 extends into the housing 20 is in clearance fit with the housing 20.

In this embodiment, the clearance fit not only ensures proper limitation of the position of the protruding portion 32 by the housing 20, but also reduces the force exerted between the protruding portion 32 and the housing 20 while the protruding portion 32 extends into the housing 20, thereby reducing the risk of friction between the protruding portion 32 and the housing 20, reducing the resulting particles, reducing the deformation of the housing 20, and improving the safety performance of the battery cell 7.

In some embodiments, in a direction pointing to the sidewall 22 from the electrode assembly 10, the clearance between the outer peripheral face 321 of the protruding portion and the inner wall face 221 of the sidewall is 0.02 mm to 0.5 mm in size.

Illustratively, "the direction pointing to the sidewall from the electrode assembly" may be the radial direction.

Illustratively, in the direction pointing to the sidewall 22 from the electrode assembly 10, the clearance between the outer peripheral face 321 of the protruding portion and the inner wall face 221 of the sidewall is L1 in size. The smaller the value of L1, the higher the risk of friction between the outer peripheral face 321 of the protruding portion and the inner wall face 221 of the sidewall, and the higher the risk of generating particles. The larger the value of L1, the wider the range in which the protruding portion 32 is movable after the protruding portion 32 extends into the housing 20, and the higher the risk of poor welding between the extension portion 36 and the housing 20. Based on tests, the inventor hereof sets the value of L1 to 0.02 mm to 0.5 mm to counterbalance the risk and improve the safety performance.

In some embodiments, an avoidance slot 363 is disposed on the inner surface 361 of the extension portion. The avoidance slot 363 is disposed around the protruding portion 32, and a slot wall face of the avoidance slot 363 is configured to connect the inner surface 361 of the extension portion and the outer peripheral face 321 of the protruding portion.

The recessed portion 33 and the protruding portion 32 may be formed by a stamping process. The inventor finds that, during the stamping, stress concentration occurs at the junction between the protruding portion and the extension portion. In order to reduce the stress concentration, the inventor tries disposing a rounded corner at the junction between the protruding portion and the extension portion. However, after the formation by stamping, the rounded surface is formed at the junction between the inner surface of the extension portion and the outer peripheral face. The rounded surface is relatively smooth, and may abut on the first outer end face while the protruding portion is inserted into the housing, making the first outer end face unable to closely fit with the inner surface of the extension portion.

In view of this, the inventor disposes an avoidance slot 363 on the extension portion 36. A part of the extension portion 36, which is opposite to the avoidance slot 363, is connected to the protruding portion 32. The avoidance slot 363 is recessed, so as to provide a flow space for a material of the protruding portion during formation of the protruding portion 32. In this way, the rounded corner is formed on the part that is of the extension portion 36 and that is opposite to the avoidance slot 363. The rounded surface is a part of the slot wall face of the avoidance slot 363. The slot wall face is recessed against the inner surface 361 of the extension portion. Therefore, this embodiment ensures the first outer end face 223 to smoothly abut on the inner surface 361 of the extension portion.

In some embodiments, an outer surface 362 of the extension portion is flush with the outer surface 312 of the cap body.

In this embodiment, the external support structure is able to support the battery cell 7 through the extension portion 36 and the cap body 31, thereby increasing the area of the load-bearing part of the end cap 30 and increasing stability of the battery cell 7.

In some embodiments, in the direction pointing to the sidewall 22 from the electrode assembly 10, the extension portion 36 does not extend beyond the outer wall face 222 of the sidewall.

This embodiment prevents the extension portion 36 from increasing a maximum size of the battery cell 7, and ensures a high energy density of the battery cell 7. In addition, the end cap 30 is relatively thin. The extension portion 36 may scratch other external components if extending beyond the outer wall face 222 of the sidewall.

In some embodiments, in the direction pointing to the sidewall 22 from the electrode assembly 10, the outer wall face 222 of the sidewall extends beyond the extension portion by 0.02 mm to 0.5 mm.

The second weld portion W2 formed by welding the inner surface 361 of the extension portion to the first outer end face 223 of the sidewall 22 may protrude beyond an end face 364 of the extension portion 36. If the outer wall face 222 of the sidewall is flush with the end face 364 that is of the extension portion 36 and that is oriented away from the protruding portion 32, the second weld portion W2 may protrude beyond the outer wall face 222 of the sidewall to increase the maximum size of the battery cell 7 and is prone to scratch other external members. Therefore, this embodiment makes the outer wall face 222 of the sidewall extend beyond the extension portion 36 to reduce the risk that the second weld portion W2 protrudes beyond the outer wall face 222 of the sidewall.

In the direction pointing to the sidewall 22 from the electrode assembly 10, the outer wall face 222 of the sidewall extends beyond the extension portion 36 by an amount of L2. The smaller the value of L2, the higher the risk that the second weld portion W2 protrudes beyond the outer wall face 222 of the sidewall. The larger the value of L2, the smaller the connection area between the extension portion 36 and the sidewall 22, and the lower the connection strength between the extension portion 36 and the sidewall 22.

Based on tests, the inventor hereof sets the value of L2 to 0.02 mm to 0.5 mm, and therefore, on the premise of ensuring high connection strength, minimizes the risk that the second weld portion W2 protrudes beyond the outer wall face 222 of the sidewall.

In some embodiments, in the direction pointing to the sidewall 22 from the electrode assembly 10, an amount L3 by which the extension portion 36 extends beyond the outer peripheral face 321 of the protruding portion is less than a wall thickness of the sidewall 22.

Illustratively, L3 is a distance between the end face 364 of the extension portion 36 and the outer peripheral face 321 of the protruding portion in the radial direction.

In this embodiment, when the outer peripheral face 321 of the protruding portion abuts on the inner wall face 221 of the sidewall, because the wall thickness of the sidewall 22 is greater than the amount by which the extension portion 36 protrudes beyond the outer peripheral face 321 of the protruding portion, the outer wall face 222 of the sidewall extends beyond the extension portion 36 in the direction pointing to the sidewall 22 from the electrode assembly 10.

Figure 11:
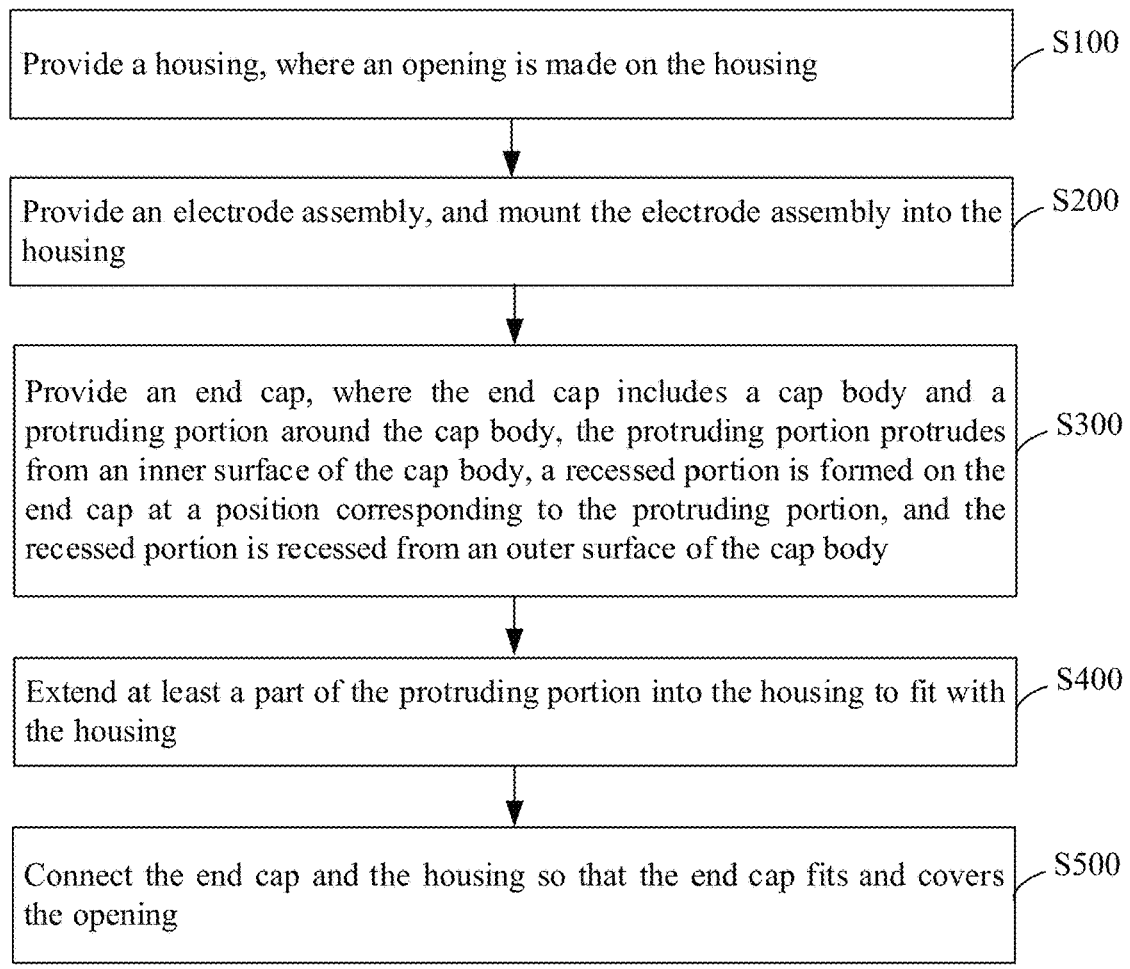
FIG. 11 is a schematic flowchart of a method for manufacturing a battery cell according to some embodiments of this application.

FIG. 11 is a schematic flowchart of a method for manufacturing a battery cell according to some embodiments of this application.

As shown in FIG. 11, the method for manufacturing a battery cell according to an embodiment of this application includes the following steps:

S100: Providing a housing, where an opening is made on the housing;

S200: Providing an electrode assembly, and mounting the electrode assembly into the housing;

S300: Providing an end cap, where the end cap includes a cap body and a protruding portion around the cap body, the protruding portion protrudes from an inner surface of the cap body, a recessed portion is formed on the end cap at a position corresponding to the protruding portion, and the recessed portion is recessed from an outer surface of the cap body;

S400: Extending at least a part of the protruding portion into the housing to fit with the housing; and S500: Connecting the end cap and the housing so that the end cap fits and covers the opening.

The protruding portion protrudes from an inner surface of the cap body toward the electrode assembly, the recessed portion is recessed from an outer surface of the cap body toward the electrode assembly, and the recessed portion is configured to release a stress while the protruding portion extends into the housing.

It is hereby noted that, for the related structure of the battery cell manufactured by the foregoing method for manufacturing a battery cell, refer to the descriptions of the battery cells provided in the foregoing embodiments.

In assembling a battery cell based on the foregoing method for manufacturing a battery cell, it is not necessary to perform the foregoing steps in sequence. That is, the steps may be performed in the order mentioned in the embodiments, or the steps may be performed in order different from what is mentioned in the embodiments, or several steps are performed concurrently. For example, step S100 and step S300 are not necessarily performed sequentially, but may be performed simultaneously.

Figure 12:
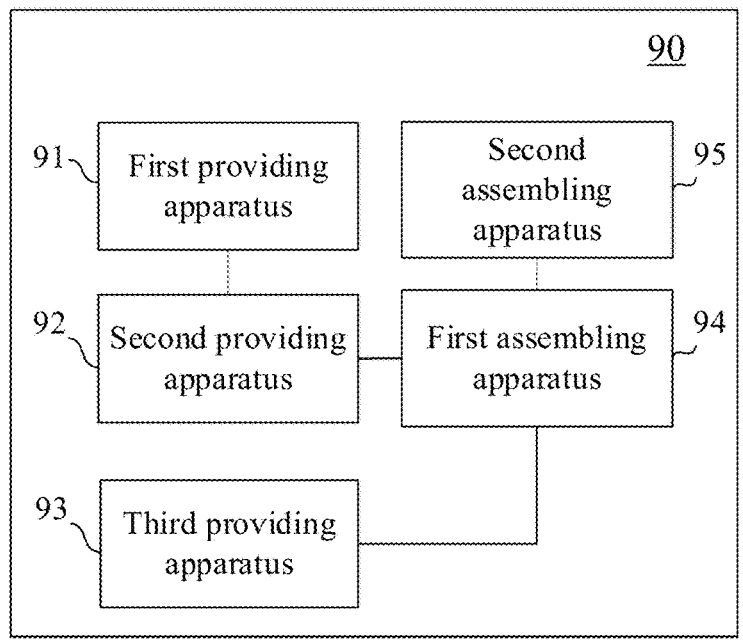
FIG. 12 is a schematic block diagram of a system for manufacturing a battery cell according to some embodiments of this application.

FIG. 12 is a schematic block diagram of a system for manufacturing a battery cell according to some embodiments of this application.

As shown in FIG. 12, the system 90 for manufacturing a battery cell according to an embodiment of this application includes:

a first providing apparatus 91, configured to provide a housing, where an opening is made on the housing;

a second providing apparatus 92, configured to provide an electrode assembly, and mount the electrode assembly into the housing;

a third providing apparatus 93, configured to provide an end cap, where the end cap includes a cap body and a protruding portion around the cap body, the protruding portion protrudes from an inner surface of the cap body, a recessed portion is formed on the end cap at a position corresponding to the protruding portion, and the recessed portion is recessed from an outer surface of the cap body;

a first assembling apparatus 94, configured to extend at least a part of the protruding portion into the housing to fit with the housing; and a second assembling apparatus 95, configured to connect the end cap and the housing so that the end cap fits and covers the opening, where The protruding portion protrudes from an inner surface of the cap body toward the electrode assembly, the recessed portion is recessed from an outer surface of the cap body toward the electrode assembly, and the recessed portion is configured to release a stress while the protruding portion extends into the housing.

For the related structure of the battery cell manufactured by the foregoing manufacturing system, refer to the descriptions of the battery cells provided in the foregoing embodiments.

It is hereby noted that to the extent that no conflict occurs, the embodiments of this application and the features in the embodiments may be combined with each other.

Finally, it is hereby noted that the foregoing embodiments are merely intended to describe the technical solutions of this application but not to limit this application. Although this application has been described in detail with reference to the foregoing embodiments, a person of ordinary skill in the art understands that modifications may still be made to the technical solutions described in the foregoing embodiments, or equivalent replacements may still be made to some technical features in the technical solutions. Such modifications and replacements do not make the essence of the corresponding technical solutions depart from the spirit and scope of the technical solutions of the embodiments of this application.

What is claimed is:

1. A battery cell, comprising:
   a housing having an opening;
   an electrode assembly, accommodated in the housing; and
   an end cap to fit and cover the opening, wherein the end cap comprises a cap body and a protruding structure around the cap body, the protruding structure protrudes from an inner surface of the cap body toward the electrode assembly, and at least a part of the protruding structure is located in the housing and fit with the housing, wherein
   a recess is formed on the end cap at a position corresponding to the protruding structure, and the recess is recessed from an outer surface of the cap body toward the electrode assembly and releases a stress while the protruding portion extends into the housing,
   the electrode assembly is provided with a first tab at one end facing the end cap,
   a current collecting structure is provided between the protruding structure and the first tab,
   the protruding structure is electrically connected to the first tab via the current collecting structure, and the protruding structure abuts against the current collecting structure in a thickness direction of the end cap,
   the end cap further comprises an extension structure protruding beyond an outer peripheral face of the protruding structure and surrounding the protruding structure, and the extension structure is welded to a sidewall of the housing around the opening so that the housing and the end cap are connected into one piece,
   the extension structure is welded to a first outer end face of the sidewall of the housing to form a weld structure, the first outer end face of the sidewall of the housing being an outermost end of the sidewall of the housing in the thickness direction of the end cap, and in the thickness direction of the end cap, the weld structure is closer to the electrode assembly than the outer surface of the cap body, and
   in a direction pointing to the sidewall from the electrode assembly, an outer wall face of the sidewall extends beyond the weld structure.

2. The battery cell according to claim 1, wherein, in the thickness direction of the end cap, a bottom face of the recess is closer to the electrode assembly than the entire inner surface of the cap body.

3. The battery cell according to claim 1, wherein an avoidance slot is disposed on the inner surface of the extension structure, the avoidance slot is disposed around the protruding structure, and a slot wall face of the avoidance slot is configured to connect the inner surface of the extension structure and the outer peripheral face of the protruding structure.

4. The battery cell according to claim 1,
   wherein, in the direction pointing to the sidewall from the electrode assembly, the outer wall face of the sidewall extends beyond an end face of the extension structure by 0.02 mm to 0.5 mm.

5. The battery cell according to claim 1, wherein the extension structure and the protruding structure are integral parts of the end cap and comprise a same material of the end cap.

6. The battery cell according to claim 1, wherein the sidewall of the housing extends along the thickness direction of the end cap and is disposed around the electrode assembly, and an inner wall face of the sidewall and the outer peripheral face of the protruding structure are both parallel to the thickness direction, and are disposed opposite to each other.

7. The battery cell according to claim 6, wherein the protruding structure further comprises a guide face oriented toward the sidewall, the guide face is connected to an end that is the outer peripheral face of the protruding structure and that is closer to the electrode assembly than the outer peripheral face of the protruding structure, and the guide face tilts away from the inner wall face of the sidewall against the outer peripheral face of the protruding structure to guide the protruding structure to extend into the housing.

8. The battery cell according to claim 1, wherein the protruding structure is in clearance fit with the housing to form a clearance between the outer peripheral face of the protruding structure and the inner wall face of the sidewall.

9. The battery cell according to claim 8, wherein, in a direction pointing to the sidewall from the electrode assembly, the clearance between the outer peripheral face of the protruding structure and the inner wall face of the sidewall is 0.02 mm to 0.5 mm in size.

10. The battery cell according to claim 1, wherein the first tab of the electrode assembly is electrically connected to the housing by the end cap.

11. The battery cell according to claim 10,
    wherein the housing comprises the sidewall and a bottom wall,
    the sidewall extends along the thickness direction of the end cap and is disposed around the electrode assembly,
    the bottom wall is connected to one end of the sidewall and located on a side that is of the electrode assembly that is oriented away from the end cap, and
    an electrode lead-out hole is disposed on the bottom wall;
    a second tab is disposed on the electrode assembly at an end oriented toward the bottom wall, and
    the first tab and the second tab are of opposite polarities; and
    the battery cell further comprises an electrode terminal mounted in the electrode lead-out hole, and
    the electrode terminal is electrically connected to the second tab.

12. The battery cell according to claim 10, wherein the first tab is a negative tab, and a substrate material of the housing is steel.

13. A battery, comprising a plurality of battery cells comprising the battery cell according to claim 1.

14. An electrical device, comprising the battery according to claim 13, wherein the battery is configured to provide electrical energy.

* * * * *